Patented July 13, 1937

2,087,107

UNITED STATES PATENT OFFICE 2,087,107

CHROME-MAGNESIA REFRACTORY AND METHOD

Russell P. Heuer, Bryn-Mawr, Pa., assignor to General Refractories Company, a corporation of Pennsylvania No Drawing. Application June 29, 1936, Serial No. 87,956

15 Claims. (Cl. 25—156)

My invention relates to the manufacture of refractory brick from a mixture of chrome and magnesia, and more particularly to the manufacture of brick which are suitable for use without kiln firing. The present invention is a development of the inventions described and claimed in my U. S. Patents Nos. 1,845,968; 1,992,482 and 1,992,483.

A purpose of my invention is to produce a basic refractory brick especially suited to suspended furnace roofs of metallurgical and chemical furnaces.

A further purpose is to obtain, from a mixture of chrome and magnesia, a refractory brick having improved resistance to spalling, crushing, high temperatures and basic slags, and improved volume stability, with high density.

A further purpose is to employ, in a refractory brick made from a mixture of chrome and magnesia, chrome particles of an optimum size of between 3 and 20 mesh per linear inch, or preferably between 3 and 10 mesh per linear inch or between 3 and 6 mesh per linear inch.

In a refractory brick having larger chrome particles and smaller magnesia particles, a further purpose is to employ smaller magnesia particles in an optimum proportion of between 25% and 35%, in order to give maximum resistance to spalling, crushing, high temperatures and basic slags, and maximum volume stability, with high density.

A further purpose is to produce a refractory brick using between 65% and 75% (preferably 70%) of larger chrome particles of between 3 and 20 mesh per linear inch, between 35% and 25% of smaller magnesia particles through 50 mesh per linear inch, and a bond such as sulphuric acid, sodium acid sulphate, an organic bond or sodium silicate, permissibly adding clay, molding the brick under a pressure exceeding 1000 pounds per square inch (70.3 kilograms per square centimeter) and preferably exceeding 10,000 pounds per square inch (703 kilograms per square centimeter), and employing the brick in a metallurgical or chemical furnace without previous firing.

Further purposes appear in the specification and in the claims.

My invention relates both to the processes involved and to the brick produced.

In my Patent No. 1,845,968 I described a chrome brick containing magnesia. In my Patents Nos. 1,992,482 and 1,992,483 I disclose brick made from various mixtures of chrome and magnesia and having the desirable quality of very high density.

I have discovered that the resistance to spalling, to crushing, to high temperatures and to basic slags, and the volume stability of refractory brick made from mixtures of chrome and magnesia can be still further increased, beyond the properties obtained for brick produced according to my patents above mentioned, without serious loss in density or increase in porosity.

The present invention is directed to obtaining these advantages particularly for the purpose of meeting the severe requirements of basic suspended furnace roofs, to take the place of silica brick now commonly used in the roofs of copper smelting furnaces and other metallurgical furnaces. The brick of the present invention is specially useful for suspended roofs of the type disclosed in my U. S. application, Serial No. 707,084, filed January 18, 1934, entitled suspended furnace roof. The quality mainly suiting the brick of the present invention to suspended arch construction is the abnormally high resistance to spalling.

Due to their unusual resistance to basic oxides and/or high temperatures, I also find that the brick of the present invention may be employed with great satisfaction in open hearth steel furnaces, copper and other non-ferrous metallurgical furnaces, rotary kilns, chemical furnaces, etc.

Chrome is a satisfactory basic refractory for many purposes because of the great strength, hardness, resistance to crushing and volume stability of its particles and their chemical inertness in the metallurgical furnace. A typical analysis of chrome ore used for refractory purposes is here shown:—

| | Per cent |
|---|---|
| Ignition loss | 1.60 |
| Silica | 5.14 |
| Ferrous oxide | 15.41 |
| Alumina | 21.77 |
| Lime | trace |
| Magnesia by difference | 17.09 |
| Chromic oxide | 38.99 |
| Total | 100.00 |

This analysis is, of course, subject to variation within the usual commercial range.

Chrome has the advantage over magnesia in that it is of lower cost and much less subject to shrinkage during use of the refractory in a metallurgical or chemical furnace. On the other hand, chrome is not so easy to bond as magnesia, is far less basic than magnesia and is much less resistant to iron oxide and other basic oxides which may come in contact with the finished brick.

In my brick mix I propose to utilize larger particles of chrome ore in such a way as to obtain a desirable, volume stable skeleton in the brick. I prefer to use chrome ore rather than magnesia for forming this skeleton since magnesia would show an excessive shrinkage at high temperature. I supplement these larger chrome particles with additions of smaller particles of magnesia. These magnesia particles serve as a coating upon the chrome particles and protect the chrome, thus making the brick more resistant to iron oxide and any other basic oxides. In this way I overcome the objectionable properties of chrome ore, i. e., its failure to resist iron oxide and other basic oxides, and I also avoid the objectionable feature of magnesia, i. e., its tendency to shrink excessively when made into brick form and exposed to high temperature.

For the smaller particles I employ magnesia which is desirably the calcined or dead-burned magnesite or periclase of usual commercial grade. One typical analysis is as follows:

| | Per cent |
|---|---|
| Ignition loss | 0.00 |
| Silica | 0.67 |
| Ferric oxide | 7.13 |
| Alumina | 0.25 |
| Lime | 2.29 |
| Magnesia by difference | 89.66 |
| Total | 100.00 |

This analysis is, of course, subject to variation within the usual commercial range.

The size of the chrome particles is quite critical and, from the standpoint of resistance to spalling, resistance to crushing, volume stability and resistance to high temperature, the optimum size of chrome particles is important. For the brick of the present invention, the chrome particles should range in size between 3 and 20 mesh per linear inch, and they may very desirably be even more closely graded as to size, for example ranging between 3 and 10 mesh per linear inch or between 3 and 7 mesh per linear inch, or between 3 and 6 mesh per linear inch, etc.

Of course it will be understood that no commercial screening process is one hundred per cent efficient and that, notwithstanding due care, chrome particles commercially produced to range in size between 3 and 20 mesh per linear inch, 3 and 10 mesh per linear inch, 3 and 6 mesh per linear inch, etc., will have a certain small proportion, possibly as much as 10% or even in an extreme case 15% in the dry mix, of chrome particles of smaller size. Likewise, there may be a small proportion, possibly 1% or 2% or even in an extreme case 5% in the dry mix, of chrome particles of larger size. Based on the weight of the refractory, there may be as much as 15% of the larger particles outside the chosen size range due to the inefficiency of commercial screening. This will be made clear by the following typical screen analysis of chrome particles commercially graded to be within 3 and 10 mesh per linear inch in one case, and between 3 and 6 mesh per linear inch in another case:

| Mesh per linear inch | 3 x 10 | 3 x 6 |
|---|---|---|
| On 3 | 1% | 2% |
| Through 3 on 4 | 13 | 36 |
| Through 4 on 6 | 27 | 56 |
| Through 6 on 8 | 29 | 4 |
| Through 8 on 10 | 18 | 2 |
| Through 10 on 14 | 7 | Nil |
| Through 14 on 20 | 5 | Nil |
| Through 20 | Nil | Nil |
| Total | 100% | 100% |

In the present invention I omit intermediate size particles or maintain the quantity of intermediate size particles very low as explained in my Patents Nos. 1,992,482 and 1,992,483. The magnesia smaller particles should pass 50 mesh per linear inch. They have the following typical screen analysis, showing that a small proportion, not above about 3% in the finished brick, is larger than 50 mesh per linear inch (387.5 mesh per square centimeter):

*Mesh per linear inch*

| | |
|---|---|
| On 35 | trace |
| Through 35 on 65 | 12% |
| Through 65 on 100 | 16 |
| Through 100 | 72 |
| Total | 100% |

It will of course be evident that the fineness of the smaller particles may be increased, using smaller particles for example below 60 mesh per linear inch.

Of the chrome larger particles, I employ between 65% and 75% (that is, between 65 and 75 parts in 100 parts), preferably using about 70%. Of the magnesia smaller particles, I employ between 35% and 25% (between 35 and 25 parts in 100 parts), preferably using about 30%.

To a slight extent chrome may be substituted for magnesia and magnesia for chrome without affecting the special properties of the brick, although the larger particles will be chiefly chrome and the smaller particles chiefly magnesia. The larger particles will preferably comprise in excess of 80% chrome and not over 20% magnesia, while the smaller particles will preferably comprise in excess of 80% magnesia and not over 20% chrome. This will be understood when reference is made in the claims to larger particles of chrome and smaller particles of magnesia.

Conventional brick-making practice is used as far as the preparation of the brick mix is concerned. The larger chrome particles and smaller magnesia particles are mixed with water, preferably adding enough water to temper the mix, desirably about 2% based on the weight of the wet mix. As a bonding substance, sulphuric acid may be used. One suitable mix might be bonded with about 1% of 66° Baumé sulphuric acid based upon the weight of the wet mix (the percentage is practically the same if based on the dry finished brick). As much as 2% or even more of sulphuric acid may be used. Where sulphuric acid of another strength is used, allowance should be made in the percentage employed. For some uses clay may be added as a bond, and as much as 2% or less desirably even 5% of clay may be added if desired in addition to the sulphuric acid.

Other bonding substances such as sodium acid sulphate, sodium silicate or organic bonding substances like waste liquors from the sulphite paper process, dextrin, etc., may be used. The quantity of sodium acid sulphate, sodium silicate or organic bonding substance will most desirably be limited to 1% or permissibly 2% of the wet mix, not considering in this 2% the water which is used to dissolve the bonding substance. In any case the quantity of any such bonding substance will not exceed 5% of the wet mix. Clay, preferably not exceeding 2%, but less desirably up to 5% of the wet mix, may be used with any of the above bonding substances.

The total bonding substance will very desirably be limited to 5% of the wet mix so as not to impair the refractory properties of the brick. The bonding substance may be mixed with the tempering water before incorporating the water in the mix.

The moistened and bonded mix is molded under a pressure exceeding 1000 pounds per square inch (70.3 kilograms per square centimeter), preferably exceeding 5000 pounds per square inch (351.5 kilograms per square centimeter), and most desirably exceeding 10,000 pounds per square inch (703 kilograms per square centimeter). It is preferable to apply a vacuum during the molding, increasing the pressure in a second step after the vacuum is applied.

A typical screen analysis of the brick after mixing with water and pressing at 10,000 pounds per square inch (703 kilograms per square centimeter) is as follows, the larger particles in the two cases considered being respectively between 3 and 10 and between 3 and 6 mesh per linear inch, and 70% of larger particles to 30% of smaller particles being used in both cases:

| Mesh per linear inch | 3 x 10 | 3 x 6 |
| --- | --- | --- |
| On 3 | Nil | 2% |
| Through 3 on 4 | 10% | 14 |
| Through 4 on 6 | 16 | 24 |
| Through 6 on 10 | 26 | 17 |
| Through 10 on 20 | 13 | 5 |
| Through 20 on 35 | 3 | 2 |
| Through 35 on 65 | 4 | 4 |
| Through 65 on 100 | 4 | 4 |
| Through 100 | 24 | 28 |
|  | 100% | 100% |

The molded brick are treated to develop the bond, so that the brick need not be kiln fired, but may be shipped in unburned condition and subjected to firing temperature for the first time in the metallurgical or chemical furnace in which they are used. The preferred treatment to develop the bond is to heat the moist brick to a temperature between 212° and 572° F. (100° and 300° C.) until substantially all moisture is removed. The dry brick are then ready for use.

Although density is not the prime consideration in the present invention, the brick of the present invention in unfired condition after drying for 75 hours at 257° F. (125° C.) has a bulk specific gravity of about 3.20. The open pore space is less than 10%.

A very high resistance to spalling is obtained in the finished brick as indicated by tests under conditions of actual use. The crushing strength of the dry unfired brick exceeds 2000 pounds per square inch (140.5 kilograms per square centimeter) and often exceeds 4000 pounds per square inch (281 kilograms per square centimeter).

The brick of the present invention is very volume stable and has excellent resistance to high temperature, as indicated by the fact that when reheated in a testing furnace to 3300° F. (1815° C.) for 24 hours or more the brick show a change in linear dimensions of less than 1% shrinkage.

Tests under actual conditions of use indicate very high resistance to basic slags and other basic oxides.

The efficiency of the sulphuric acid bond depends of course upon the presence of magnesia smaller particles and is slightly diminished by substitution of chrome smaller particles for magnesia. The bond, after it is once developed, is effective at ordinary room temperatures and is supplemented, after the brick are heated to firing temperature during use, by a reaction between the constituents of the brick. The excellent service characteristics of the brick of the present invention, and particularly the resistance to spalling, crushing, high temperatures and basic slags, and the volume stability, are due in part to the tight interfitting between particles, the firm bonding of the particles, the presence of an optimum size of chrome particles and the presence of an optimum proportion and optimum size of magnesia particles.

Where reference is made in the claims to a sulphate acid bonding substance I intend to include both sulphuric acid and acid sulphates such as sodium acid sulphate.

All percentages mentioned herein are percentages by weight unless otherwise indicated by the context. Open pore space and porosity is of course expressed as percentage by volume. The percentages of the chrome and magnesia particles are percentages by weight based upon the dry mix. They may also be expressed as parts instead of percentage. The percentages of water and bonding substance are percentages by weight based upon the wet mix. The screen analyses are expressed in percentages by weight based upon the total material being analyzed.

Percentages based upon the dry mix are substantially identical for practical purposes with percentages based upon the dry finished brick, and one can be used as the other without change if desired.

The other patents and applications referred to herein are incorporated by reference and made a part hereof.

In view of my invention and disclosure, variations and modifications to meet individual whim or particular need will doubtless become evident to others skilled in the art, to obtain all or part of the benefits of my invention without copying the structure shown, and I, therefore, claim all such in so far as they fall within the reasonable spirit and scope of my invention.

Having thus described my invention what I claim as new and desire to secure by Letters Patent is:—

1. In the manufacture of refractory brick suitable for use without previous kiln firing, the process which comprises mixing from 65 to 75 parts of larger particles consisting chiefly of chrome ore and large enough to be retained on a 20 mesh per linear inch screen, with from 35 to 25 parts of smaller particles consisting chiefly of magnesia and small enough to pass through a 50 mesh per linear inch screen, and with a bonding substance, molding the mixture into brick under pressure exceeding 1000 pounds per square inch and treating the brick without kiln firing to develop the bond.

2. In the manufacture of refractory brick suitable for use without previous kiln firing, the process which comprises mixing from 65 to 75 parts of larger particles consisting chiefly of chrome ore and large enough to be retained on a 10 mesh per linear inch screen, with from 35 to 25 parts of smaller particles consisting chiefly of magnesia and small enough to pass through a 50 mesh per linear inch screen, and with a bonding substance, molding the mixture into brick under pressure exceeding 1000 pounds per square inch and treating the brick without kiln firing to develop the bond.

3. In the manufacture of refractory brick suitable for use without previous kiln firing, the process which comprises mixing from 65 to 75 parts of larger particles consisting chiefly of chrome ore and large enough to be retained on a 6 mesh per linear inch screen, with from 35 to 25 parts of smaller particles consisting chiefly of magnesia and small enough to pass through a 50 mesh per linear inch screen, and with a bonding substance, molding the mixture into brick under pressure exceeding 1000 pounds per square inch and treating the brick without kiln firing to develop the bond.

4. In the manufacture of refractory brick suitable for use without previous kiln firing, the process which comprises mixing from 65 to 75 parts of larger particles consisting chiefly of chrome ore, small enough to pass through a 3 mesh per linear inch screen and large enough to be retained on a 20 mesh per linear inch screen, with from 35 to 25 parts of smaller particles consisting chiefly of magnesia and small enough to pass a 50 mesh per linear inch screen, and with a bonding substance, molding the mixture into brick under pressure exceeding 1000 pounds per square inch and treating the brick without kiln firing to develop the bond.

5. In the manufacture of refractory brick suitable for use without previous kiln firing, the process which comprises mixing from 65 to 75 parts of larger particles more than 80% of which are chrome ore and which are large enough to be retained on a 20 mesh per linear inch screen, with from 35 to 25 parts of smaller particles consisting chiefly of magnesia and small enough to pass through a 50 mesh per linear inch screen, and with a bonding substance, molding the mixture into brick under pressure exceeding 1000 pounds per square inch and treating the brick to develop the bond.

6. In the manufacture of refractory brick suitable for use without previous kiln firing, the process which comprises mixing from 65 to 75 parts of larger particles consisting chiefly of chrome ore and large enough to be retained on a 20 mesh per linear inch screen, with from 35 to 25 parts of smaller particles more than 80% of which are dead burned magnesite and which are small enough to pass through a 50 mesh per linear inch screen, and with a bonding substance, molding the mixture into brick under pressure exceeding 1000 pounds per square inch and treating the brick without kiln firing to develop the bond.

7. A dry chrome-magnesia refractory brick, unfired and suitable for use in unfired condition, comprising a tightly interfitted mass of from 65 to 75 parts of larger particles consisting chiefly of chrome ore and large enough to be retained on a 20 mesh per linear inch screen, from 35 to 25 parts of smaller particles consisting chiefly of magnesia and small enough to pass through a 50 mesh per linear inch screen and a bonding substance.

8. A dry chrome-magnesia refractory brick, unfired and suitable for use in unfired condition, comprising a tightly interfitted mass of from 65 to 75 parts of larger particles consisting chiefly of chrome ore and large enough to be retained on a 10 mesh per linear inch screen, from 35 to 25 parts of smaller particles consisting chiefly of magnesia and small enough to pass through a 50 mesh per linear inch screen and a sulphate acid bonding substance.

9. A dry chrome-magnesia refractory brick, unfired and suitable for use in unfired condition, comprising a tightly interfitted mass of from 65 to 75 parts of larger particles consisting chiefly of chrome ore and large enough to be retained on a 10 mesh per linear inch screen, from 35 to 25 parts of smaller particles consisting chiefly of magnesia and small enough to pass through a 50 mesh per linear inch screen and sulphuric acid as a bonding substance.

10. A dry chrome-magnesia refractory brick, unfired and suitable for use in unfired condition, comprising a tightly interfitted mass of from 65 to 75 parts of larger particles consisting chiefly of chrome ore and large enough to be retained on a 10 mesh per linear inch screen, from 35 to 25 parts of smaller particles consisting chiefly of magnesia and small enough to pass through a 50 mesh per linear inch screen and sodium acid sulphate as a bonding substance.

11. A dry chrome-magnesia refractory brick, unfired and suitable for use in unfired condition, comprising a tightly interfitted mass of from 65 to 75 parts of larger particles consisting chiefly of chrome ore and large enough to be retained on a 10 mesh per linear inch screen, from 35 to 25 parts of smaller particles consisting chiefly of magnesia and small enough to pass through a 50 mesh per linear inch screen and an organic bonding substance.

12. A dry chrome-magnesia refractory brick, unfired and suitable for use in unfired condition, comprising a tightly interfitted mass of from 65 to 75 parts of larger particles consisting chiefly of chrome ore and large enough to be retained on a 10 mesh per linear inch screen, from 35 to 25 parts of smaller particles consisting chiefly of magnesia and small enough to pass through a 50 mesh per linear inch screen and an effective quantity not exceeding 5% of clay as a bonding substance.

13. A dry chrome-magnesia refractory brick, unfired and suitable for use in unfired condition, comprising a tightly interfitted mass of from 65 to 75 parts of larger particles more than 80% of which are chrome ore and which are small enough to pass through a 3 mesh per linear inch screen and large enough to be retained on a 10 mesh per linear inch screen, from 35 to 25 parts of smaller particles more than 80% of which are dead burned magnesite and which are small enough to pass through a 50 mesh per linear inch screen, and an effective quantity and not exceeding 5% of a bonding substance.

14. A dry chrome-magnesia refractory brick, unfired and suitable for use in unfired condition, having a cold crushing strength in excess of 2000 pounds per square inch and comprising a tightly interfitted mass of from 65 to 75 parts of larger particles more than 80% of which are chrome ore and which are small enough to pass through a 3 mesh per linear inch screen and large enough to be retained on a 10 mesh per linear inch screen, from 35 to 25 parts of smaller particles more than 80% of which are dead burned magnesite and which are small enough to pass through a 50 mesh per linear inch screen, and an effective quantity and not exceeding 5% of a bonding substance.

15. A dry chrome-magnesia refractory brick, unfired and suitable for use in unfired condition, having a bulk specific gravity in excess of 3.10 and comprising a tightly interfitted mass of from 65 to 75 parts of larger particles more than 80% of which are chrome ore and which are small enough to pass through a 3 mesh per linear inch screen and large enough to be retained on a 10 mesh per linear inch screen, from 35 to 25 parts of smaller particles more than 80% of which are dead burned magnesite and which are small enough to pass through a 50 mesh per linear inch screen, and an effective quantity and not exceeding 5% of a bonding substance.

RUSSELL P. HEUER.